United States Patent Office 3,018,249
Patented Jan. 23, 1962

3,018,249
PROCESS FOR MAKING AN IMPROVED LUBRI-
CANT CONTAINING SALTS OF CARBOXYLIC
ACIDS
Arnold J. Morway, Clark, N.J., and Cloyce R. Daniels,
Bridgeville, and Robert P. Spray, Pittsburgh, Pa., as-
signors to Esso Research and Engineering Company,
a corporation of Delaware
No Drawing. Filed Oct. 29, 1959, Ser. No. 849,432
6 Claims. (Cl. 252—39)

This invention relates to fluid lubricating oil compo-
sitions containing calcium salts of mixed fatty acids and
methods for their preparation. Particularly, the inven-
tion relates to a method of preparing fluid lubricating
compositions containing calcium salts of acetic acid and
$C_7$ to $C_{12}$ fatty acids by controlled neutralization of
said fatty acids in situ in said lubricating oil.

This application is a continuation-in-part of Serial
No. 634,450, filed January 16, 1957, now U.S. Patent
No. 2,973,321.

Recently fluid lubricants containing calcium salts of
acetic acid and intermediate molecular weight fatty acids
have become important for lubrication of marine diesel
cylinders. These fluid compositions have extreme pres-
sure properties and at the same time avoid the high rates
of wear usually associated with E.P. lubricants. In the
past this lubricant has been prepared as an approximate
40% salt-thickened base, which was then diluted back
with additional oil to a fluid, or semi-fluid, consistency.
The base was prepared by coneutralization of the acids
with lime in the presence of the mineral oil at steam
kettle temperatures, e.g. 300°–320° F. In the commer-
cial manufacture of the base, between 1.3 and 1.5%
excess lime over and above that required for stoichi-
ometric reaction with the acids was employed. By this
method it was believed that the reaction with the acids
would be forced to completion to form completely neu-
tralized acids, and any excess lime would be held in
suspension and act as a neutralizing agent to prevent
acid corrosion in service in marine diesel engines. It
has since been found that occasionally in long period
of storage or under vibration as occurs in engine room
tanks, this excess lime in the finished liquid product
tends to settle out and in settling out brings down some
of the dispersed salts by occlusion. This sediment con-
taining material, if passed into lubrication lines can
cause clogging of the lines and can plug dispensers.
Part of the sediment which forms under these conditions
is unreacted calcium carbonate which is present in com-
mercial lime in quantities up to about 5%. While cal-
cium carbonate can react with the acids, the preferred
reaction is between the calcium hydroxide and the acids.
Thus, when an excess of commercial lime was used, all
the calcium hydroxide reacted while calcium carbonate
remained unreacted and later formed sediment. To ma-
terially reduce this undispersible insoluble sediment (it
cannot be eliminated entirely chemically since com-
mercial lime contains small amounts of unreactive in-
gredients, such as silica, magnesium oxide, aluminum
oxide, etc.), it has now been found that the neutralization
is best carried out in two stages. By employing a slight
(2–5%) deficiency in the amount of lime first added,
the excess acid, particularly the acetic acid, will then
react with the calcium carbonate and remove it. The
small amount of remaining excess acid is then neutral-
ized with a second addition of hydrated lime, or by a
small amount of sodium hydroxide, lithium hydroxide
or sodium methoxide. In this manner, the carbonate is
kept to a very small amount in the final fluid lubricant.
The second neutralization can be made after the initial
salt formation is complete and the mixture is warm
(178°–200° F.), and preferably after a determination
of free acidity has been made. Also it is desirable
that the second addition of lime or other base, be suffi-
cient to make the lubricant slightly alkaline, e.g. 0.05
to 0.6% free alkalinity calculated as NaOH. However,
in no case during the first neutralization reaction should
the temperature of the reaction mixture be allowed to
exceed 200° F. Thus, if the reaction mixture during
the first stage neutralization does go above 200° F., and
particularly above 225° F., a distinct gelling or thick-
ening effect occurs and it is impossible to obtain a fluid
final product having the desired salt content. In fact,
it is preferred that no external heating whatsoever be
applied to the first stage reaction mixture, the heat of
reaction being sufficient. However, after the second
stage neutralization is carried out, then the mixture is
heated to temperatures of about 250° to 400° F., pref-
erably about 300° to 360° F. in order to dehydrate the
reaction mixture and eliminate the water of reaction.
By this procedure, the effect of heat in causing thicken-
ing is minimized. Finally, the reaction mixture concen-
trate may be diluted with additional oil, additives added,
homogenized, etc. to form the final lubricant.

The final lubricating compositions to which the meth-
od of the invention is directed, comprise a major amount
of the lubricating base oil and about 2 to 25, e.g. 5 to
20 wt. percent of the mixed salt-thickener. This thick-
ener, in turn, comprises a co-neutralized mixture of the
calcium salts of acetic acid (or acetic acid anhydride)
and $C_7$ to $C_{12}$ fatty acids. Usually about 4 to 20, pref-
erably 7 to 15 moles of acetic acid per mole of $C_7$ to
$C_{12}$ fatty acid will be used. As mentioned above, the
mixed-salt thickener is usually made in situ in the lu-
bricating oil in the form of a concentrate. This concen-
trate can contain about 25 to 60% of the thickener, but
usually contains about 40%.

The operable intermediate molecular weight fatty
acids, i.e. the $C_7$ to $C_{12}$ acids, will include the straight
chain acids, i.e. capric, caprylic, nonanoic acid, lauric
acid, etc.

If desired, various inorganic acids may be used to
replace part of the acetic acid component in the prep-
aration of the thickener. Thus, strong mineral acids
such as hydrochloric acid, nitric acid, sulfuric acid, or-
thophosphoric acid and spent acids from sulfonation
processes may also be incorporated. An especially
preferred inorganic acid is orthophosphoric acid, which
is economical, and less corrosive to steel equipment than
acetic acid. Furthermore, by using the phosphoric acid
to replace a portion of the acetic acid, the resulting
lubricant is made more resistant to color and oxidation
degradation than if no phosphoric acid was used. Di-
thiodialkyl phosphoric acids wherein the alkyl groups contain 3 to 10 carbon atoms are also effectively used. Also various inorganic salts may be used, such as alkaline earth metal or alkali metal (e.g. sodium and lithium) nitrites, phosphates and chromates may be added to the lubricant.

Various other additives may also be added to the lubricating composition (e.g. 0.1 to 10.0 weight percent based on the total weight of the composition), for example, oxidation inhibitors such as phenyl-alpha-naphthylamine; corrosion inhibitors, such as sorbitan monooleate; stabilizers such as aluminum hydroxy stearate, and the like.

Although any mineral lubricating oil may be used, certain base oils give better results in preventing sight-glass fouling in lubricating systems. A preferred base oil comprises about 60 to 83 wt. percent of naphthenic or paraffinic oil and about 17 to 40 wt. percent of solvent extract. All of said weight percentages being based upon the total amount of base oil. Base oil compositions of this type will have a viscosity of 65 to 100, preferably 70 to 80 SUS at 210° F., and a V.I. (Dean and Davis viscosity index) of 30 to 100, preferably 35 to 70.

The naphthenic lubricating oil referred to above is a neutral distillate oil prepared from a naphthenic crude oil. It will have a viscosity of 40 to 80 SUS at 210° F., and a V.I. of 30 to 60. Commercial oils of this type used in the working examples are Diol 40 and Diol 80.

The solvent extract will have a viscosity of 100 to 175 SUS at 210° F. and a V.I. below 0, e.g. —100 to 0. It can be prepared by solvent extraction of paraffinic or mixed base lubricating oil with phenol, furfural, nitrobenzene, etc. as is known in the art. A commercial oil of this type which was used in the examples of the invention is available under the name of Nuso 125.

Another commercial mineral oil that can be used to advantage is Tia Juana A–200 which is phenol extracted, dewaxed hydrofined Venezuelan distillate having a viscosity of 927 SUS at 100° F., 74.7 SUS at 210° F. and a V.I. of 67. This oil can be used directly without blending with other oil or it may be blended with naphthenic lubricating oil.

The above types of oils are well known in the art and the exact method of their manufacture forms no part of this invention. Rather they are described herein only to the extent necessary to identify the preferred oils contemplated by the invention.

The fluid compositions of the invention are best prepared by first forming a concentrate containing a high percentage of the mixed salt thickener, which concentrate is then diluted back with additional oil to form the final fluid product. The concentrate is prepared by charging about 10 to 40 wt. percent of the total oil to be used to a kettle, after which all of the lime is added. Then the combined acids are slowly added while stirring, during which time the temperature will rise to about 140° to 200° F. The rate of addition of the acids should be such that at no time does the heat of reaction raise the temperature above 225° F. The amount of acids at this point should be about 2 to 5 wt. percent (calculated as oleic acid) in excess of the total amount of acids needed for complete neutralization of the lime. In other words, after this first partial neutralization, the reaction mixture should show about 2 to 5 wt. percent free acidity calculated as oleic acid. The mixture is then stirred for about ½ to 3 hours in order to allow completion of the partial neutralization and to permit the acetic acid to react with all the calcium carbonate that may be present. Next, the second addition of lime or of sodium hydroxide, lithium hydroxide or sodium methoxide is made in an amount sufficient to give a concentrate product which is either neutral or slightly alkaline. After the second addition of neutralizing agent, the mixture is then stirred while heating to 300° to 340° F. At this temperature, cooling is initiated. When the mixture reaches a temperature of about 200° F., additives such as phenyl-alpha-naphthylamine may be added following which the base is cooled and the remainder of the lubricating oil added. When cooled to about 110° F. the product may then be homogenized in a Manton-Gaulin homogenizer, Charlotte mill, etc. and packaged.

The invention will be further understood by the following examples:

EXAMPLE I (A) *Prior method of manufacturing using single step neutralization to form a high alkalinity product*

A concentrate was prepared as follows:

A base oil blend was formed by mixing 15.54 parts by weight of Nuso 125, 7.92 parts by weight of Diol 40 and 34.0 parts by weight of Diol 80. 15.74 parts by weight of hydrated lime was slurried into the base oil blend. A mixture of 21.68 parts by weight of glacial acetic acid and 5.20 parts by weight of Wecoline AAC acid was slowly added to the oil-lime slurry. The Wecoline AAC acid is a commercial mixture of acids consisting of 28 wt. percent caprylic, 66 wt. percent capric and 16 wt. percent lauric acid. The mixture was heated to a temperature of about 320° F. until dehydrated. The concentrate mixture was then cooled by passing cold water through the kettle jacket. Phenyl-alpha-naphthylamine as an oxidation inhibitor and an additional amount of oil blend equal to about 50 wt. percent of the concentrate were next mixed in. This cutback concentrate was passed through a Charlotte mill having an 0.003″ clearance and then stored overnight. After overnight storage, the cutback concentrate was again passed through the Charlotte mill and into a mixing tank. In the mixing tank the cutback concentrate was further diluted with the above described mineral oil blend to obtain the final fluid product. The product was further finished by passing through the Charlotte mill a third time, filtering, deaerating and packaging.

(B) *Method of the invention using 2 step neutralization with low temperature during first step*

A concentrate was prepared as follows:

A base oil blend was formed by mixing 15.54 parts by weight of Nuso 125, 7.92 parts by weight of Diol 40 and 35 parts by weight of Diol 80. 14.74 parts by weight of hydrated lime was slurried into this base oil blend. A mixture consisting of 21.68 parts by weight of glacial acetic acid and 5.20 parts by weight of Wecoline AAC acid was slowly added to the oil-lime slurry. The addition of the acetic and Wecoline acids was slowly made so that the maximum temperature of the reaction mass caused by the heat of the reaction was about 120° to 130° F. After all the acid was added, a free acidity determination showed 5.0% acidity calculated as oleic acid. Then additional lime was added to the reaction mixture to bring the free alkalinity to 0.48% calculated as NaOH. External heating was then applied and the temperature of the reaction mass was raised to 320° F. and maintained until said mass was dehydrated. Cooling water was then passed through the kettle jacket. Phenyl-alpha-naphthylamine and an additional amount of oil blend equal to about 50 wt. percent of the concentrate was added. This cutback concentrate was then finished in the same manner described in A above to give the final diluted product.

(C) *2 step method of neutralization but cooking to 320° F. while on the acid side*

This preparation was carried out in the same general manner as B above except that after the first neutralization, the acid reaction mass (i.e. having an acidity equivalent to 5.0% oleic acid) was first heated to 320° F. and the second neutralization carried out at this temperature.

TABLE

|  | Example I | | |
|---|---|---|---|
|  | A | B | C |
| Concentrate Composition (Parts by weight): | | | |
| Glacial acetic acid | 21.68 | 21.68 | 21.68. |
| Wecoline AAC Acid | 5.20 | 5.20 | 5.20. |
| Hydrated lime | 15.74 | 14.74 | 14.74. |
| Nuso 125 | 15.54 | 15.54 | 15.54. |
| Diol 40 | 7.92 | 7.92 | 7.92. |
| Diol 80 | 34.00 | 35.00 | 35.00. |
| Percent free alkalinity [1] (Calc. as NaOH) | 1.48 | 048 | 0.48. |
| Finished Lubricant Composition (Parts by weight): | | | |
| Glacial acetic acid | 3.95 | 3.95 | 3.95. |
| Wecoline AAC acid | 0.95 | 0.95 | 0.95. |
| Hydrated lime | 2.88 | 2.69 | 2.69. |
| Nuso 125 | 23.00 | 23.00 | 23.00. |
| Diol 40 | 11.70 | 11.70 | 11.70. |
| Diol 80 | 57.38 | 57.57 | 57.57. |
| Phenyl $\alpha$-Naphthylamine | 0.14 | 0.14 | 0.14. |
| Properties of Finished Lubricant: | | | |
| Sulfated Ash, percent | 6.19 | 5.19 | 5.19. |
| SUS Vis./100° F | 1,566 | 1,566 | Gelled. |
| SUS Vis./210° F | 83.0 | 87.7 | 102.2. |
| Percent Free alkalinity [1] (Calc. as NaOH) | 0.3 | 0.02 | 0.02. |
| 4-Hour Centrifuge Test @ 1,800 r.p.m.-wt. percent Solids separated | 3.0 | 0.8 | Large portion of gel comes out. |
| 100 Mesh Screen Test | Solids on Screen | Product flows thru screen readily. | Does not pass readily thru screen. |
| Barrel Storage test 6 mos. (100° F.) | ½ to 2 inches sediment on bottom of barrel. | No sediment or separation other than ¼ inch of serum of clear oil on surface of drum. | |

[1] Determined by ASTM D-664 method.

As seen by the above table, composition A which represents the prior art single step neutralization process of forming a fairly alkaline product showed storage instability and incomplete dispersion as indicated by the Centrifuge test, the Screen test and the Barrel Storage test. On the other hand, composition B prepared in accordance with the concept of the invention showed up very well in these tests. Composition C, although it contained the same amount of thickener as Example B, gelled at a temperature of 100° F. In addition, composition C showed up very poorly in the Centrifuge test and the Screen test and was of no value as a fluid lubricant. Composition C illustrates the importance of carrying out the first stage neutralization at a relatively low temperature, i.e. below about 225° F. in order to prevent excess thickening and gelling.

What is claimed is:

1. A method for the preparation of a fluid lubricating composition comprising a major amount of mineral lubricating oil and about 2 to 25 wt. percent of mixed calcium salts of acetic acid and $C_7$ to $C_{12}$ fatty acid, said salts being in a molar ratio of about 4 to 20 moles of salt of acetic acid per mole of salt of $C_7$ to $C_{12}$ fatty acid, said method comprising neutralizing at a temperature below 225° F. a slurry of commercial lime containing calcium carbonate in at least a portion of said oil by the addition of an excess of said acids to completely neutralize said lime including the calcium carbonate present, adding metal base to complete the neutralization of the excess acid and provide an alkaline product, and dehydrating the lubricant by heating at a temperature of about 250 to 400° F.

2. A method according to claim 1, wherein said metal base is lime.

3. A method according to claim 2, wherein the amount of metal salts in said fluid lubricating composition is about 5 to 20 wt. percent of the total composition and wherein the mole ratio of salt of acetic acid to salt of $C_7$ to $C_{12}$ fatty acid is about 7:1 to 15:1.

4. A method according to claim 3, wherein said lubricant is dehydrated at a temperature of about 300° to 340° F. to form anhydrous salts.

5. A method for the preparation of a fluid lubricating composition comprising a major amount of mineral lubricating oil and about 2 to 25 wt. percent of mixed calcium salts of acetic acid and $C_7$ to $C_{12}$ fatty acid, said salts being in a molar ratio of about 4 to 20 moles of salt of acetic acid per mole of salt of $C_7$ to $C_{12}$ fatty acid, said method comprising forming a slurry of lime containing a minor amount of calcium carbonate in a portion of said oil, adding an excess of said acids to neutralize said lime and to obtain 2 to 5 wt. percent free acidity calculated as oleic acid, stirring said reaction mixture for a time sufficient to allow completion of the neutralization of the lime and of substantially all the calcium carbonate that may be present, adding additional lime to complete the neutralization of the excess acid and provide an alkaline product, heating the reaction mixture to a temperature of about 300° to 340° F. sufficient to dehydrate said mixture, cooling and adding the remainder of said lubricating oil to form said fluid lubricating composition.

6. A method according to claim 5, wherein said acetic acid is formed by the addition of acetic acid anhydride to the reaction mixture.

References Cited in the file of this patent

UNITED STATES PATENTS

| 2,434,539 | Beerbower et al. | Jan. 13, 1948 |
| 2,850,457 | Thompson et al. | Sept. 2, 1958 |
| 2,930,757 | Morway et al. | Mar. 29, 1960 |

OTHER REFERENCES

The Manufacture and Application of Lubricating Greases, Boner, Reinhold Pub. Co., New York, 1954, page 357.